Figure 1:
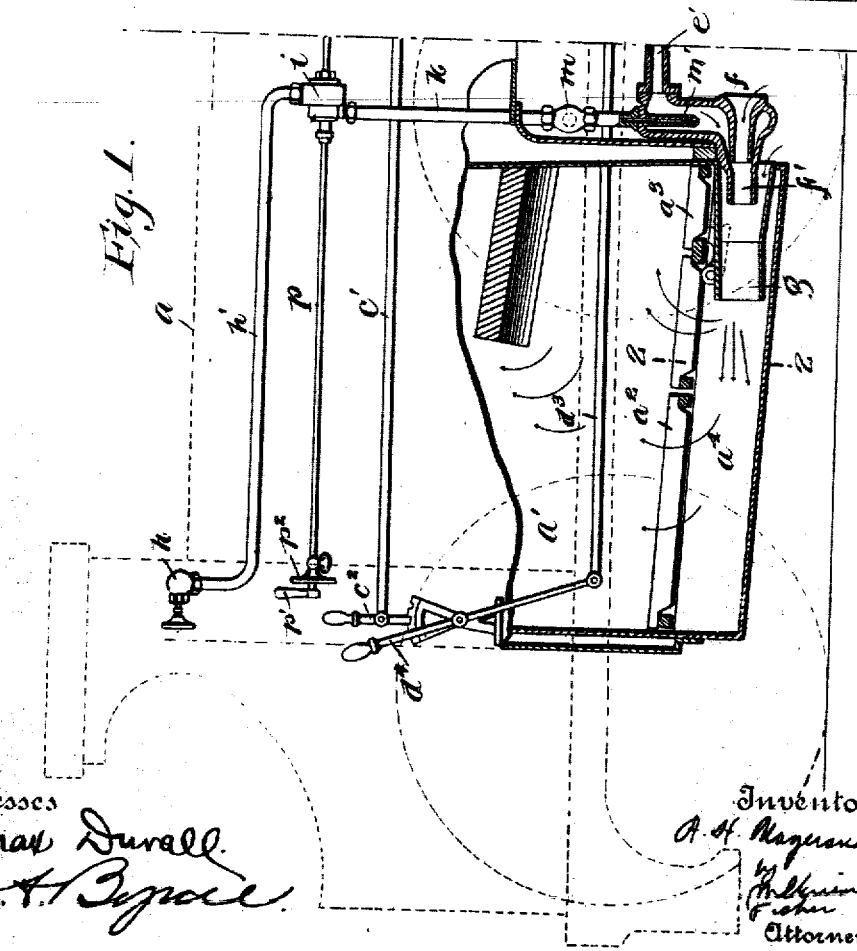

No. 811,570. PATENTED FEB. 6, 1906.
A. H. MAZERAUD.
DRAFT APPARATUS FOR BOILER FURNACES.
APPLICATION FILED JULY 22, 1905.

3 SHEETS—SHEET 1.

Witnesses
W. Max Duvall.
Geo. F. Bynoe.

Inventor
A. H. Mazeraud,
by
Attorneys

No. 811,570. PATENTED FEB. 6, 1906.
A. H. MAZERAUD.
DRAFT APPARATUS FOR BOILER FURNACES.
APPLICATION FILED JULY 22, 1905.

3 SHEETS—SHEET 2.

Witnesses

Inventor
A. H. Mazeraud
Attorneys

No. 811,570. PATENTED FEB. 6, 1906.
A. H. MAZERAUD.
DRAFT APPARATUS FOR BOILER FURNACES.
APPLICATION FILED JULY 22, 1905.

3 SHEETS—SHEET 3.

Witnesses
W. May Duvall
Geo. H. Bryce

Inventor
A. H. Mazeraud
by Wilkinson & Fisher
Attorneys

UNITED STATES PATENT OFFICE.

ALEXANDRE HONORÉ MAZERAUD, OF PARIS, FRANCE.

DRAFT APPARATUS FOR BOILER-FURNACES.

No. 811,570.

Specification of Letters Patent.

Patented Feb. 6, 1906.

Application filed July 22, 1905. Serial No. 270,872.

*To all whom it may concern:*

Be it known that I, ALEXANDRE HONORÉ MAZERAUD, mechanical engineer, a citizen of the Republic of France, residing at 38$^{bis}$ Rue Vivienne, Paris, France, have invented new and useful Improvements in Draft Apparatus for Boiler-Furnaces, of which the following is a specification.

The present invention relates to means for utilizing waste steam in order to improve the conditions in which the artificial draft is effected in boilers in an extremely economical and practical manner, the draft being indispensable for obtaining on a reduced grate-surface the combustion of the amount of fuel which is necessary to produce the vapor-pressure required for running the engine. The application of the new principle to locomotives is taken by way of example and is explained in the following specification.

According to the present invention this improvement of the draft of locomotives is realized by a new utilization of the waste steam in producing a blast beneath the grating by means of this steam independently of the draft usually obtained by sending the waste steam into the funnel on its leaving the cylinders. For this purpose the waste-pipe is placed in the smoke-box, as is customary at the present time. The waste-pipe, however, is provided with an appropriate regulator, which may be used for utilizing this steam under normal conditions to obtain the usual draft or for the purpose of utilizing only a part of the steam to cause the gases of the fire-box to move toward the funnel and of sending the other part into two special injectors arranged for the use of steam at low tension, having their mouth for the steam at the bottom of the column for the waste and being arranged in front of the ash-box of the locomotive, so that the speed of the latter increases the velocity of the suction or of the entrance of the air into the injectors. The air thus aspirated is forced into nozzles which, as the case may be, are arranged either in front of the ash-box, the trap-door of which is then kept closed while the locomotive is in motion, or behind the ash-box, the latter being also kept closed on all its other sides. This draft blown in beneath the grate does not only allow of close-burning fuel (and even residues) being burned, which could not be used in the case of a natural draft which produces an insufficient influx of air for their combustion; but owing to the pressure produced in the ash-box no agglomeration of slag occurs on the grate, and the cleaning of the fireplace consequently becomes less laborious. Moreover, apart from the fact that in case of the draft constituted by the injectors being damaged the engine can run under the same conditions as at the present time, (as by a simple operation of the valves the waste can be caused to resume its ordinary useful effect.) A special device is provided to allow of the use of the injectors being continued in running the engine by means of live steam taken from the boiler should the column for the exhaust be damaged or any other reason present itself.

Figure 3:
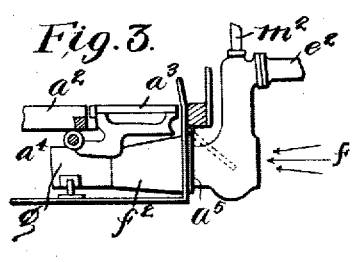
Figure 2:
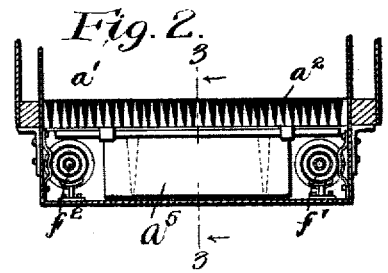
Figure 4:
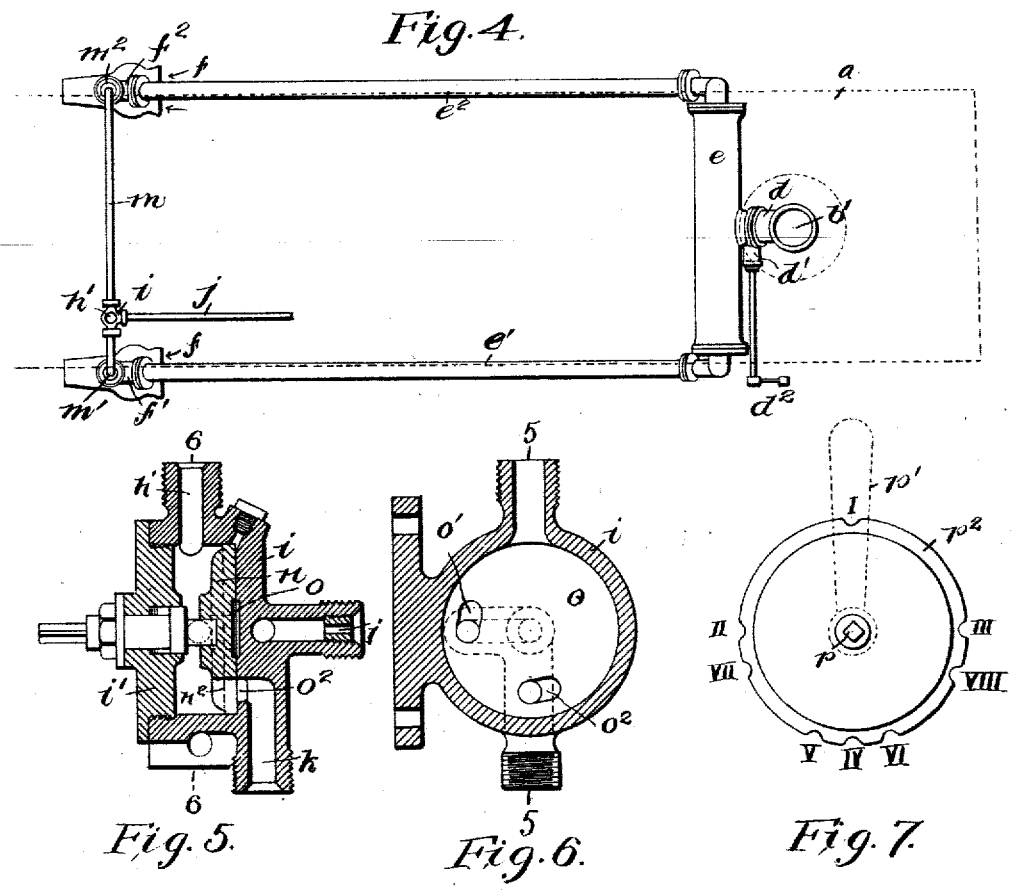
Figure 5:
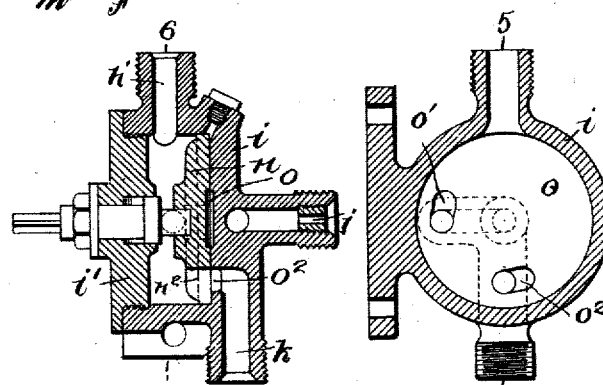
Figure 6:
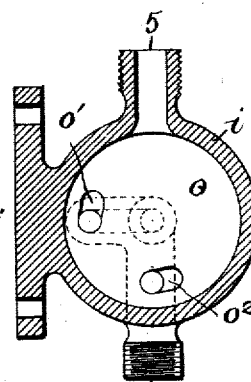
Figure 7:
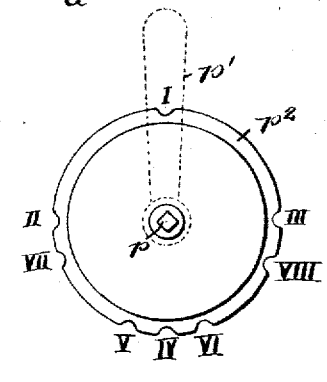
Figure 14:
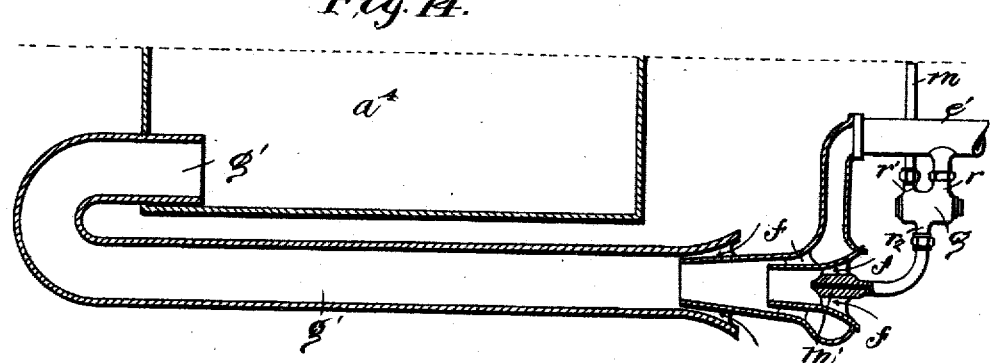
Figure 15:
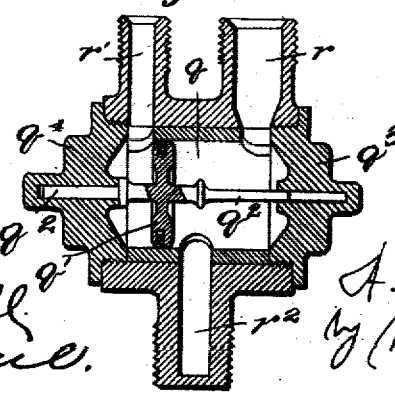

In the accompanying drawings, Figure 1 is a sectional elevation showing the apparatus applied to a locomotive, nozzles being mounted in front of the ash-box. Fig. 2 is a vertical cross-section along 2 2 of Fig. 1. Fig. 3 is a section along 3 3 of Fig. 2. Fig. 4 is a diagram of the whole contrivance. Fig. 5 is an enlarged detail of the three-way distribution for live steam, section along 5 5 of Fig. 6. Fig. 6 is a section along 6 6 of Fig. 5. Figs. 7 to 13 are explanatory diagrams showing the operation and the working of this distributer. Fig. 14 is a diagram, partly in horizontal section, showing the arrangement of the apparatus having nozzles mounted for receiving the air at the back of the ash-box, as well as the automatic by-pass. Fig. 15 is a vertical section, on a larger scale, of the by-pass shown in Fig. 14.

$a$, Fig. 1, denotes the whole of the locomotive, (shown merely in its outlines,) $a'$ being the furnace, $a^2$ the grate with its movable section $a^3$, and $a^4$ the ash-box, provided with a door $a^5$, Figs. 2 and 3, in front.

On leaving the cylinders the exhaust arrives in the usual way at $b$, Fig. 1, at the bottom of the exhaust-column $b'$, the column mounted as usual in the smoke-box $a^6$, forming a vertical blast-pipe, the outlet of which is generally situated at the same height as the upper row of the smoke-pipes. This column, in combination with the funnel $a^7$, constitutes an injector in which the flow of the steam produces in a well-known manner a comparative vacuum, which induces the gases from the furnace to rush in, and in consequence of the vacuum produced in the furnace facilitates the passage of air coming from the ash-box across the fuel-bed.

The blast-pipe $b'$ carries any suitable regulator, the operating-axis $c$ of which is alone shown in the drawings and can be operated by the driver at pleasure by means of the rod $c'$ and the lever $c^2$. This regulator is designed in such a manner that the exhaust-steam can be used under normal conditions to obtain the usual draft or only a part of the exhaust may be used in the blast-pipe to merely produce a current of gas from the furnace to the funnel, leaving another part of this steam for a purpose to be described hereinafter. On the other hand, at the bottom of the exhaust-column $b'$ a tube $d$ is joined, having an operating-valve $d'$, which can be operated by the driver by means of the arm $d^2$, rod $d^3$, and lever $d^4$ to regulate at pleasure the passage of the exhaust-steam at that point. The tube $d$ preferably opens into a reservoir $e$ to prevent fluctuation. At this reservoir two tubes $e'$ and $e^2$ start, which open, respectively, into a suction-injector $f'$ $f^2$, specially contrived for the use of steam at low pressure. Of these tubes one is placed on each side and in front of the ash-box $a^4$. In this way while the engine is in motion the velocity of the locomotive increases the velocity of the air-suction produced at $f$ by the passage of the steam through the injectors. The air thus aspirated is then forced into the nozzles $g$, which, if possible, may preferably be arranged, as shown in Fig. 1, in front of the ash-box $a^4$, the trap-door $a^5$ of which is kept closed while the locomotive is in motion. As in certain engines, however, nozzles could not easily be mounted in front of the ash-box owing to the movable grates and in spite of the use of partially-movable grates and other special devices, the arrangement shown in Fig. 14 may advantageously be adopted in this case. In this arrangement the injectors, such as $f'$, mounted in front of the engine, are always contrived in such a manner that they receive at $f$ air at the speed of the motion of the engine, this speed being increased by the speed resulting from the suction power of the injectors, the air being, however, afterward forced into the nozzles $g'$, arranged at the back of the ash-box $a^4$, the latter being also kept closed on all its other sides.

It is readily seen that owing to the above arrangements the exhaust-steam can easily be led away on issuing from the cylinders by means of the waste-tube $b'$ in the usual manner or that by a suitable operation of the levers $c^2$ $d^4$, controlling the valves of the regulator mounted at $c$ and $d'$, either all or a part of the steam may be used to assure the working of the injectors $f'$ $f^2$, sucking in air from the outside and forcing it into the ash-box.

It is thus possible to combine at pleasure in a permanent or momentary way without any supplementary expenditure of steam and to the extent required the draft caused by the exhaust through the funnel and the draft blown in beneath the grate by means of the injectors or to use these drafts independently of one another. On the other hand, the conditions under which the injectors are worked may be modified by operating the throttle-valve $d'$ of the regulator, according to circumstances, allowing for the power of vaporization required, the nature of the fuel, the state of the fire, &c. It will, moreover, be understood that the operating-levers $c^2$ $d^4$ instead of being independent might be combined so as to connect the movement of the valves of the regulator with the admission of steam.

In order to continue in case of need the working of the injectors with live steam, should this be necessary or merely advantageous, owing to the exhaust-column being damaged, for instance, or for some other reason, the following device allows of the draft induced and blown in being combined with a blast of live steam either in a permanent or in a momentary manner and in any desired proportion. From the cock $h$, Fig. 1, for the admission of steam in communication with the boiler leads a tube $h'$, which is connected, by means of a three-way distributer $i$, on the one hand, to the steam-blower fixed inside the funnel by means of the tube $j$, on the other hand by means of the tube $k$ to the connecting-pipe $m$, which is joined to two other injectors $m'$ $m^2$, which are worked with live steam and are also used for aspirating air at $f$, forcing the air into the same nozzles $g$ (or $g'$) as do the injectors $f'$ $f^2$ previously described. The distributer $i$ (shown on a larger scale in Figs. 5 to 13) consists, essentially, of a box provided with three nozzles, which are respectively joined to the pipes $h'$, $j$, and $k$, and which box is fixed to the body of the boiler $a$. In this box, which is closed by a screwed head $i'$, a disk or valve $n$ is mounted, which is provided with two notches or ports $n'$ $n^2$, susceptible of coöperating with two ports by means of the bell-mouthed apertures $o'$ $o^2$ at the surface of the seat $o$, formed in the box $i$ and against which the valve $n$ works. The aperture $o'$ is in communication with the nozzle joined to the pipe $j$, which leads to the steam-blower, whereas the aperture $o^2$ communicates with the tube $k$, joined to the live-steam injectors $m'$ $m^2$. The valve $o$ can be operated by the driver by means of the rod $p$ and the handle $p'$, which coöperates with a dial and indicator $p^2$, having several stops corresponding to the various positions of the valve.

Figure 8:
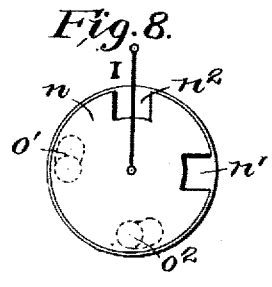
Figure 10:
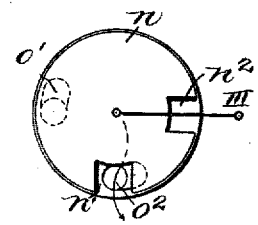
Figure 12:
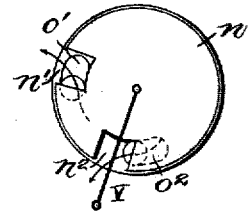
Figure 9:
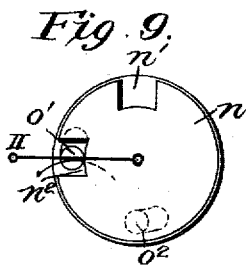
Figure 11:
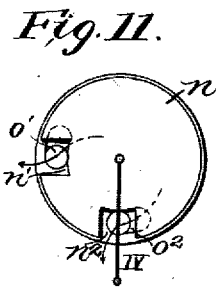
Figure 13:
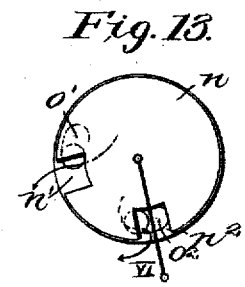

On bringing the handle $p'$ into position I, Fig. 8, a position of complete closure is attained and no live steam passes either to the steam-blower or to the injectors. In position II, Fig. 9, the distributer passes steam through the aperture $o'$ to the steam-blower of the funnel alone. In position III, Fig. 10, the valve $n$ uncovers the aperture $o^2$ and feeds the injectors with steam. In position IV, Fig. 11, the apertures $o'$ and $o^2$ are both uncovered and steam is admitted both to the steam-blower and to the injectors. In position V, Fig. 12, the valve closes half the aperture $o^2$, and owing to the apertures having a flared form the aperture $o'$ is still completely uncovered, so that steam is fully admitted to the steam-blower, but only half of the possible amount is admitted to the injectors. Again, in position VI, Fig. 13, the aperture $o^2$ being completely uncovered, whereas $o'$ is half closed, steam is fully admitted to the injectors and only half the amount possible is admitted to the steam-blower. It is easily seen that on bringing the handle $p'$ into the intermediate positions corresponding to the stops VII and VIII, Fig. 7, half the possible amount of steam is admitted to the steam-blower and half the amount to the injectors. It is, moreover, possible to combine the action of the injectors $f'$ $m'$ or $f^2$ $m^2$ on each side, so that they can be worked together with exhaust-steam or that the injectors $m'$ $m^2$ can be worked with live steam, either while the injectors $f'$ $f^2$ continue to work with exhaust-steam or after the latter injectors have been stopped whether intentionally or in consequence of damage having been done to the exhaust. In this case use could be made of the automatic by-pass. (Indicated in Fig. 14 and shown in section and on a larger scale in Fig. 15.) This device consists of a cylinder $q$, in which a piston $q'$ moves freely, the piston having a rod $q^2$, which is suitably guided at its far ends by the cylinder-heads $q^3$ $q^4$. This cylinder is provided with three nozzles $r$ $r'$ $r^2$, which put its interior in communication as follows: one of them with the pipe $e'$ or $e^2$ for exhaust-steam, another with the pipe $m$ for live steam, and the third with the injector $m'$ or $m^2$. Owing to this arrangement, it is easily seen that if the communication between the admission of live steam and the pipe $m$ being closed or interrupted exhaust-steam be admitted to the pipe $e'$ (or $e^2$) the pressure of the steam exercised on the right face of the piston $q'$ will move it from right to left, (position of Fig. 15,) so that direct communication will be established between $e'$ (or $e^2$) and the injector $m'$, (or $m^2$,) the latter being then worked with exhaust-steam, concurrently with the injector $f'$ (or $f^2$.) If live steam is admitted to the pipe $m$, the admission of exhaust-steam at $e'$ (or $e^2$) being interrupted or not, the preponderant pressure of this steam on the left face of the piston $q'$, Fig. 15, will move the piston from left to right and direct communication will thereby be established between $m$ and the injector $m'$, (or $m^2$,) which will then work with live steam.

It is seen that by the judicious use of the three-way distributer and of the automatic by-pass described above a permanent or a momentary combination may be arrived at at will and in the proportion required of the induced and blast drafts obtained by exhaust-steam with the blast with live steam and that benefit can be derived from the advantages which the one or the other kind of draft may offer, according to circumstances. It need hardly be added that in all cases of blast-draft the steam (whether live steam or exhaust) mixed with air forced into the ash-box beneath the grate will be decomposed by the high temperature to which it will be submitted on coming in contact with the fuel and the hydrogen and oxygen set free will further facilitate the combustion. This new principle of combining in a permanent or a momentary manner and in the proportion required the induced and blast drafts above referred to may be applied in whole or in part to any other kind of boiler, whether stationary or for marine purposes, moreover the motor fluid may also be any kind of gas suitable for facilitating combustion obtained from any suitable source.

What I claim as my invention, and desire to secure by Letters Patent, is—

1. In a draft apparatus for boiler-furnaces, the combination of an ash-box, means for delivering a mixture of exhaust-steam, live steam and air thereinto, a blast-pipe and regulating means therein, said blast-pipe being connected to the means for delivering said mixture to the ash-box, substantially as shown and described.

2. In a draft apparatus for boiler-furnaces, the combination of an ash-box, a blast-pipe leading to the stack, regulating means in said blast-pipe, connecting means from said blast-pipe to said ash-box, a valve for regulating the quantity of exhaust-steam passing into the connecting means, means for injecting live steam into said connecting means, and means for introducing air and thus mixing the live steam, exhaust-steam and air, substantially as shown and described.

3. In a draft apparatus for boiler-furnaces, the combination of an ash-box, an injector provided with an air-inlet, a blast-pipe provided with regulating means, connections between the blast-pipe and the injector, a steam-blower, a live-steam pipe leading from the boiler to the injector, and a distributer located in the live-steam pipe for controlling the supply of steam to the injector and steam-blower, substantially as described.

4. In a draft apparatus for boiler-furnaces, the combination of an ash-box, injectors provided with air-inlets, a blast-pipe, means for regulating the exhaust-steam in said blast-pipe to produce the usual draft or by using only part of the exhaust to produce a current of gas from the furnace to the funnel, connections between the blast-pipe and the injectors, a steam-blower, a live-steam pipe leading from the boiler to the injectors, and a distributer located in the live-steam pipe for controlling the supply of steam to the injectors and steam-blower, substantially as described.

In witness whereof I have hereunto set my hand, this 11th day of July, 1905, in presence of two subscribing witnesses.

ALEXANDRE HONORÉ MAZERAUD.

Witnesses:
LOUIS RINERY,
HANSON A. COXE.